(12) United States Patent
Lin et al.

(10) Patent No.: US 12,220,981 B2
(45) Date of Patent: Feb. 11, 2025

(54) EXPANSION TANKS FOR VEHICLE COOLING SYSTEMS AND VEHICLE COOLING SYSTEMS

(71) Applicants: ZHEJIANG GEELY HOLDING GROUP CO., LTD., Zhejiang (CN); ZHEJIANG LIANKONG TECHNOLOGIES CO., LTD., Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN)

(73) Assignees: ZHEJIANG GEELY HOLDING GROUP CO., LTD., Zhejiang (CN); ZHEJIANG LIANKONG TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/256,888

(22) PCT Filed: Apr. 27, 2021

(86) PCT No.: PCT/CN2021/090143
§ 371 (c)(1),
(2) Date: Jun. 9, 2023

(87) PCT Pub. No.: WO2022/226763
PCT Pub. Date: Nov. 3, 2022

(65) Prior Publication Data
US 2024/0092160 A1    Mar. 21, 2024

(51) Int. Cl.
*B60K 11/02*    (2006.01)
(52) U.S. Cl.
CPC ................... *B60K 11/02* (2013.01)

(58) Field of Classification Search
CPC ....................................................... B60K 11/02
See application file for complete search history.

(56) References Cited

U.S. PATENT DOCUMENTS

| | | | | |
|---|---|---|---|---|
| 3,913,781 A | * | 10/1975 | Andreux | F01P 11/029 220/360 |
| 5,456,218 A | * | 10/1995 | Theorell | F01P 11/029 165/104.32 |

(Continued)

FOREIGN PATENT DOCUMENTS

| CN | 206530395 U | 9/2017 |
|---|---|---|
| CN | 206555009 U | 10/2017 |

(Continued)

OTHER PUBLICATIONS

ISA State Intellectual Property Office of the People's Republic of China, International Search Report Issued in Application No. PCT/CN2021/090143, Jan. 25, 2022, WIPO, 6 pages.

(Continued)

*Primary Examiner* — Kevin R Barss
(74) *Attorney, Agent, or Firm* — McCoy Russell LLP

(57) ABSTRACT

An expansion tank for a vehicle cooling system and a vehicle cooling system. The expansion tank includes a tank body and a chamber provided inside the tank body, a liquid inlet and a liquid outlet are provided on the tank body, a diversion channel matched with a bottom of the tank body is provided inside the tank body, both ends of the diversion channel are respectively connected with the liquid inlet and the liquid outlet, a vent hole and a liquid refill hole are sequentially provided on a side of the diversion channel in a flow direction of a coolant liquid, and the vent hole and the liquid refill hole are both communicated with the chamber. The automatic separation of the air from the coolant liquid and the automatic refill of the coolant liquid can be realized by providing the diversion channel connecting the liquid (Continued)

inlet and the liquid outlet inside the tank body, and sequentially providing the vent hole and the liquid refill hole on the side of the diversion channel in the flow direction of the coolant liquid. Since the expansion tank is directly connected in series to the main cooling circuit of the motor, the cost input and arrangement space of pipelines, pipe clamps, and liquid-gas separators are reduced, and the weight of the cooling system is also reduced.

10 Claims, 5 Drawing Sheets

(56) References Cited

U.S. PATENT DOCUMENTS

| | | | |
|---|---|---|---|
| 5,666,911 | A | 9/1997 | Gohl et al. |
| 6,123,144 | A * | 9/2000 | Morman ............... F01P 11/029 165/41 |
| 2009/0159019 | A1 * | 6/2009 | Hutchins ............... F01P 11/029 165/104.19 |
| 2011/0048345 | A1 * | 3/2011 | Popadiuc ............... F01P 11/029 123/41.5 |
| 2016/0169084 | A1 * | 6/2016 | Hügel ............... F01P 11/18 123/41.27 |
| 2017/0284280 | A1 * | 10/2017 | Grava ............... F01P 11/029 |
| 2017/0356328 | A1 | 12/2017 | Grava et al. |
| 2018/0283261 | A1 * | 10/2018 | Morishita ............... F01P 11/029 |

FOREIGN PATENT DOCUMENTS

| | | |
|---|---|---|
| CN | 107380000 A | 11/2017 |
| CN | 209369912 U | 9/2019 |
| CN | 209637872 U | 11/2019 |
| CN | 211573631 U | 9/2020 |
| CN | 215170326 U | 12/2021 |
| DE | 102006014400 B4 | 1/2012 |

OTHER PUBLICATIONS

ISA State Intellectual Property Office of the People's Republic of China, Written Opinion of the International Searching Authority Issued in Application No. PCT/CN2021/090143, Jan. 25, 2022, WIPO, 6 pages.(Submitted with Machine/ Partial Translation).
European Patent Office, Extended European Search Report Issued in Application No. 21938251.2, Feb. 26, 2024, Germany, 7 pages.

\* cited by examiner

EXPANSION TANKS FOR VEHICLE COOLING SYSTEMS AND VEHICLE COOLING SYSTEMS

CROSS REFERENCE TO RELATED APPLICATION

The present application is a U.S. National Phase of International Application No. PCT/CN2021/090143 entitled "EXPANSION KETTLE FOR VEHICLE COOLING SYSTEM AND VEHICLE COOLING SYSTEM," and filed on Apr. 27, 2021. The entire contents of the above-listed application are hereby incorporated by reference for all purposes.

TECHNICAL FIELD

The present invention pertains to the technical field of vehicle cooling systems, and relates to an expansion tank for a vehicle cooling system and a vehicle cooling system.

BACKGROUND

At present, a cooling system in a vehicle generally adopts such a form that a radiator is used to perform liquid-gas separation on a coolant liquid circulated in the cooling system, an air outlet arranged at the highest position of a water chamber in the radiator is connected with an expansion tank, and a water refill pipe of the expansion tank forms a parallel circuit with a main cooling water circuit, such that air separated by the radiator is brought into the expansion tank and stored in the expansion tank.

However, for a new energy vehicle such as a battery electric vehicle, a battery cooling system is not provided with a radiator, and orientation of the pipeline is complicated, resulting in easy accumulation of air. Therefore, rapid degassing is particularly important for a battery cooling circuit. At present, in some vehicles, a special liquid-gas separator is connected in series to a main circuit of the cooling system for degassing, the degassing effect depends on the design of the liquid-gas separator, and the addition of the liquid-gas separator leads to a sharp rise in the cost and weight of the whole cooling system.

Therefore, the degassing structure of the vehicle cooling system needs to be optimized.

SUMMARY

An objective of the present invention is to provide an expansion tank for a vehicle cooling system and a vehicle cooling system, which can realize automatic degassing of the cooling system, and can reduce cost and weight of the vehicle cooling system compared with the existing degassing method.

The objective of the present invention can be realized by the following technical solution.

An expansion tank for a vehicle cooling system includes a tank body and a chamber provided inside the tank body, where a liquid inlet and a liquid outlet are provided on the tank body, a diversion channel matched with a bottom of the tank body is provided inside the tank body, both ends of the diversion channel are respectively connected with the liquid inlet and the liquid outlet, a vent hole and a liquid refill hole are sequentially provided on a side of the diversion channel in a flow direction of a coolant liquid, and the vent hole and the liquid refill hole are both communicated with the chamber. The expansion tank is directly connected in series to a main cooling circuit of a motor, and the coolant liquid enters the expansion tank through the liquid inlet, flows through the diversion channel, and then is discharged from the expansion tank through the liquid outlet. Air in the coolant liquid leaves the diversion channel through the vent hole along with part of the coolant liquid and then enters the chamber inside the tank body, and part of the coolant liquid stored in the chamber enters the diversion channel through the liquid refill hole so as to automatically separate the air from the cooling system and maintain a steady flow of coolant liquid in the main cooling circuit. The vent hole and the liquid refill hole are provided on the side of the diversion channel, thereby avoiding NVH (Noise, Vibration and Harshness) problems caused by liquid level fluctuations.

The air separated from the cooling system is stored in the expansion tank. A pressure cover is provided on the top of the expansion tank. When the coolant liquid inside the expansion tank is insufficient, the pressure cover on the top of the expansion tank needs to be opened for refill of the coolant liquid. A pressure valve is provided on the pressure cover. When the air in the expansion tank reaches a certain amount, the air pressure may rise and the pressure valve on the pressure cover may be opened.

Furthermore, the diversion channel is in an arc bent outward, the vent hole is provided on an outer side of the diversion channel, and the liquid refill hole is provided on an inner side of the diversion channel.

Furthermore, the vent hole is provided on a top of the outer side of the diversion channel, and the liquid refill hole is provided on a bottom of the inner side of the diversion channel. Since the air can automatically rise up and exist above a liquid level of the coolant liquid, the vent hole is provide on the top of the outer side of the diversion channel, such that the air can be easily discharged. After the air is discharged, the coolant liquid is refilled through the liquid refill hole until the whole cooling system is filled with liquid.

Preferably, the vent hole and the liquid refill hole can be square holes, round holes, notches, and the like.

Furthermore, the liquid inlet is provided on a side of the tank body, and the liquid outlet is provided on the bottom of the tank body.

In this structure, at the corner of the arc-shaped diversion channel, the vent hole is designed by using the outer rounded corner as a high pressure area, and the liquid refill hole is designed by using the inner rounded corner as a low pressure area. In other words, the pressure difference between the outer rounded corner and the inner rounded corner can be used to enable venting in the high pressure area and liquid refilling in the low pressure area, such that the venting and liquid refilling functions are realized.

Alternatively, the diversion channel is a linear diversion channel, and the vent hole and the liquid refill hole are arranged on the same side of the diversion channel A turbulence structure is provided on the bottom of the tank body, so as to facilitate the venting and liquid refilling functions.

Furthermore, the turbulence structure includes a protrusion which is provided on the bottom of the tank body and protrudes upwards, where the protrusion is matched with a bottom of the diversion channel, and is located between the vent hole and the liquid refill hole. The protrusion on the bottom of the tank body, as the turbulence structure, mainly acts to increase the resistance at a certain position, thereby changing the flow field inside the diversion channel. In application, when the coolant liquid flows in the diversion channel, part of the coolant liquid containing air flows out of the diversion channel through the vent hole due to the resistance and necking effect of the protrusion, and the other part of the coolant liquid flowing through the protrusion is subject to the reduced resistance, while the inner diameter of the channel is increased, such that the coolant liquid in the chamber is sucked into the diversion channel through the liquid refill hole.

Furthermore, the liquid inlet and the liquid outlet are coaxially arranged.

Furthermore, a plurality of partitions are provided in the chamber to divide the chamber into a plurality of cavities which are communicated with each other, and the vent hole and the liquid refill hole are respectively connected with different cavities. The partitions can strengthen the tank body. Meanwhile, the partitions can divide the chamber into the plurality of cavities, and the partitions are provided with holes which can communicate two adjacent cavities. The cavities include a vent cavity and a liquid refill cavity, the vent hole is connected with the vent cavity and the liquid refill hole is connected with the liquid refill cavity, and the vent cavity is separated from the liquid refill cavity by the partition.

In this structure, the turbulence structure matched with the bottom of the diversion channel is provided on the bottom of the tank body, and the vent hole and the liquid refill hole are arranged on the same side of the diversion channel, such that the automatic liquid-gas separation is realized.

Furthermore, a clamping groove is provided on the diversion channel, and a clamping plate matched with the clamping groove is provided inside the tank body. The diversion channel is installed on the clamping plate through the clamping groove so as to realize clamping of the diversion channel, and the diversion channel just connects the liquid inlet with the liquid outlet after clamping, thereby realizing the assembly of the diversion channel inside the tank body.

Furthermore, the tank body includes an upper tank body and a lower tank body, and the liquid inlet, the liquid outlet and the diversion channel are all provided on the lower tank body. During assembly, the diversion channel is assembled on the lower tank body, and then the lower tank body is welded to the upper tank body.

A vehicle cooling system includes the expansion tank.

Compared with the related art, the present invention has the following characteristics.

1) The automatic separation of the air from the coolant liquid and the automatic refill of the coolant liquid can be realized by providing the diversion channel connecting the liquid inlet and the liquid outlet inside the tank body, and sequentially providing the vent hole and the liquid refill hole on the side of the diversion channel in the flow direction of the coolant liquid.

2) Since the expansion tank is directly connected in series to the main cooling circuit of the motor, the cost input and arrangement space of pipelines, pipe clamps, and liquid-gas separators are reduced, and the weight of the cooling system is also reduced.

3) The diversion channel can be designed in an arc bent outward or in a linear form so as to be suitable for different expansion tanks, allowing for good flexibility.

DESCRIPTION OF REFERENCE NUMERALS

1—tank body, 101—upper tank body, 102—lower tank body, 2—chamber, 3—liquid inlet, 4—liquid outlet, 5—diversion channel, 6—vent hole, 7—liquid refill hole, 8—protrusion, 9—partition, 10—clamping groove.

DETAILED DESCRIPTION

The present invention will be described in detail below in conjunction with the accompanying drawings and specific embodiments. This embodiment is implemented on the premise of the technical solution of the present invention, and detailed implementation and specific operation process are given, but the scope of protection of the present invention is not limited to the following embodiments.

Embodiment 1

Figure 2:
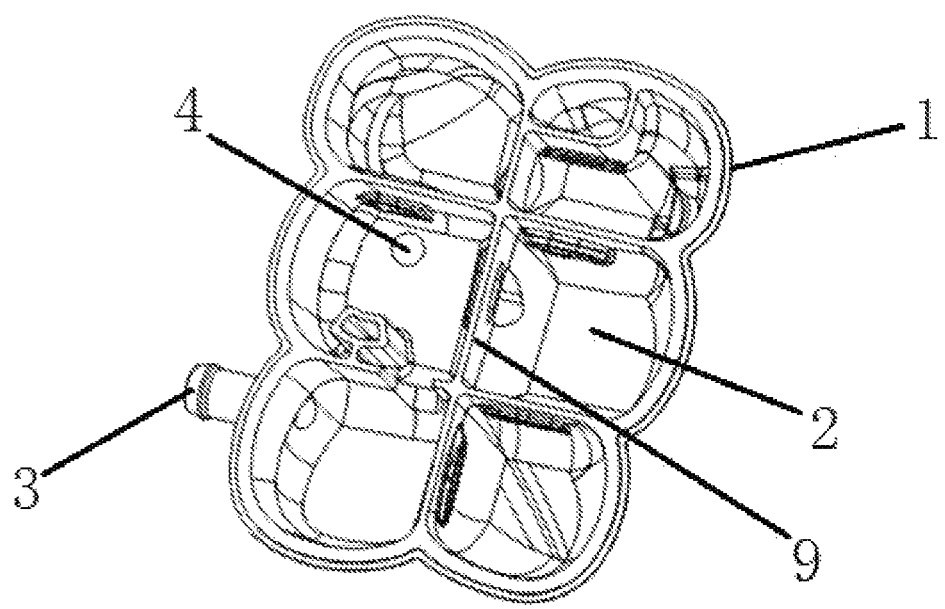
FIG. 2 is a schematic plan view illustrating a structure of a lower tank body according to Embodiment 1.
Figure 5:
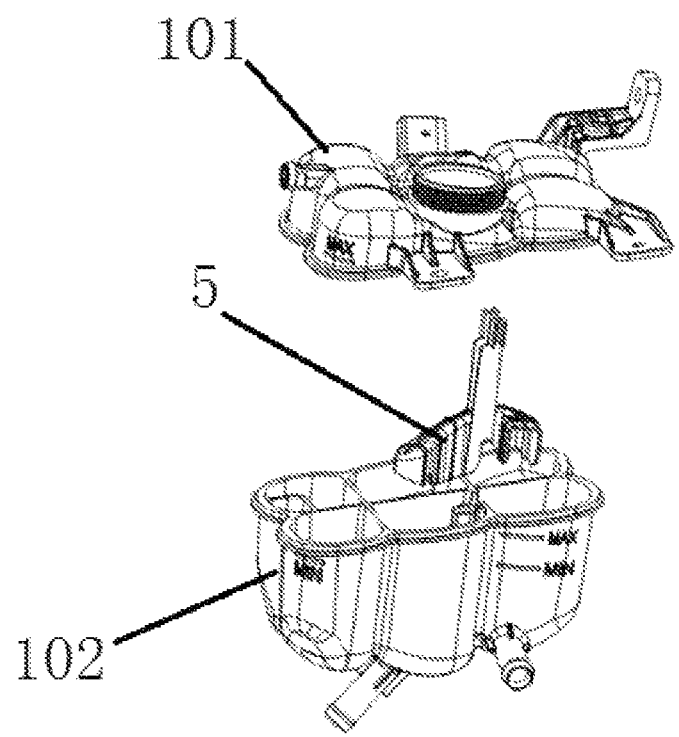
FIG. 5 is a schematic exploded view illustrating a structure of an expansion tank according to Embodiment 1.

A vehicle cooling system includes an expansion tank for the vehicle cooling system as shown in FIG. 5. The expansion tank includes a tank body 1 and a chamber 2 provided inside the tank body 1. As shown in FIG. 2, a liquid inlet 3 and a liquid outlet 4 are provided on the tank body 1. A diversion channel 5 matched with a bottom of the tank body 1 is provided inside the tank body 1, and both ends of the diversion channel 5 are respectively connected with the liquid inlet 3 and the liquid outlet 4. A vent hole 6 and a liquid refill hole 7 are sequentially provided on a side of the diversion channel 5 in a flow direction of a coolant liquid, and the vent hole 6 and the liquid refill hole 7 are both communicated with the chamber 2.

Figure 1:
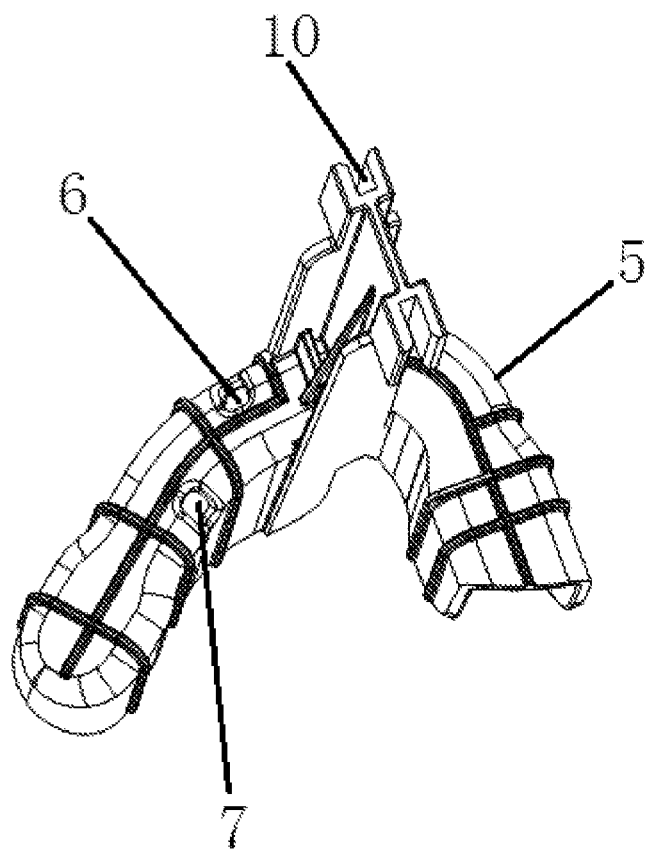
FIG. 1 is a schematic diagram illustrating a structure of a diversion channel according to Embodiment 1.
Figure 3:
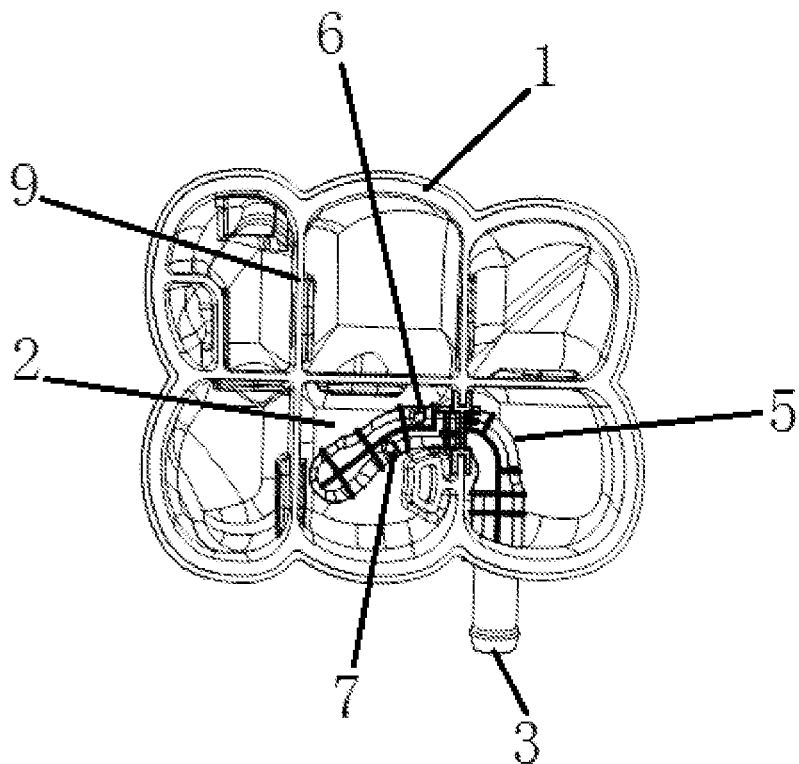
FIG. 3 is a schematic diagram illustrating a diversion channel assembled in a tank body according to Embodiment 1.
Figure 4:
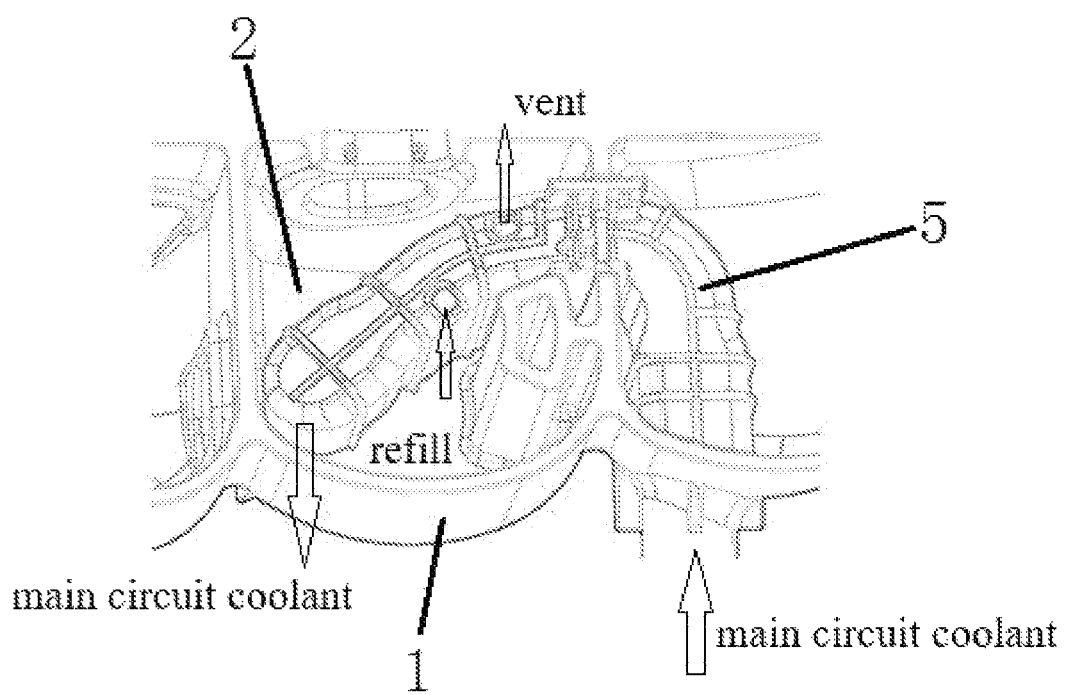
FIG. 4 is a schematic diagram illustrating principle of automatic degassing according to Embodiment 1.

As shown in FIG. 1, FIG. 3 and FIG. 4, the diversion channel 5 is in an arc bent outward, the vent hole 6 is provided on an outer side of the diversion channel 5, and the liquid refill hole 7 is provided on an inner side of the diversion channel 5. The vent hole 6 is provided on a top of the outer side of the diversion channel 5, and the liquid refill hole 7 is provided on a bottom of the inner side of the diversion channel 5. The liquid inlet 3 is provided on a side of the tank body 1, and the liquid outlet 4 is provided on the bottom of the tank body 1.

A plurality of partitions 9 are provided in the chamber 2 to divide the chamber 2 into a plurality of cavities which are communicated with each other.

A clamping groove 10 is provided on the diversion channel 5, and a clamping plate matched with the clamping groove 10 is provided inside the tank body 1.

As shown in FIG. 5, the tank body 1 includes an upper tank body 101 and a lower tank body 102, and the liquid inlet 3, the liquid outlet 4 and the diversion channel 5 are all provided on the lower tank body 102.

In this structure, at the corner of the arc-shaped diversion channel 5, the vent hole 6 is designed by using the outer rounded corner as a high pressure area, and the liquid refill hole 7 is designed by using the inner rounded corner as a low pressure area. In other words, the pressure difference between the outer rounded corner and the inner rounded corner can be used to enable venting in the high pressure area and liquid refilling in the low pressure area, such that the venting and liquid refilling functions are realized.

Embodiment 2

Figure 7:
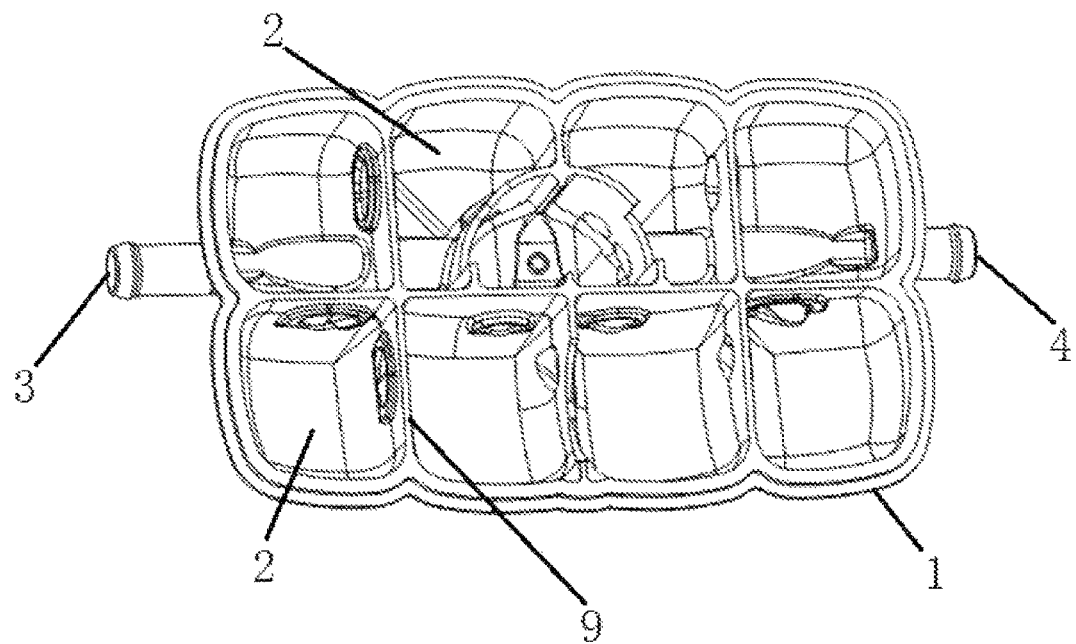
FIG. 7 is a schematic plan view illustrating a structure of a lower tank body according to Embodiment 2.
Figure 10:
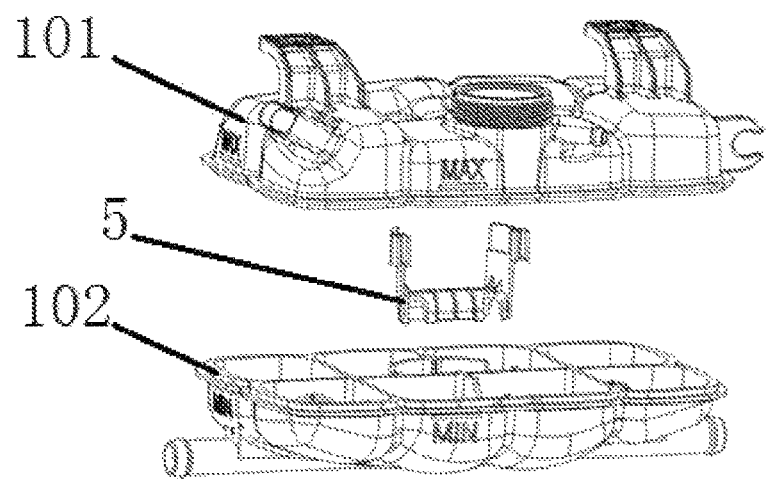
FIG. 10 is a schematic exploded view illustrating a structure of an expansion tank according to Embodiment 2.

A vehicle cooling system includes an expansion tank for the vehicle cooling system as shown in FIG. 10. The expansion tank includes a tank body 1 and a chamber 2 provided inside the tank body 1. As shown in FIG. 7, a liquid inlet 3 and a liquid outlet 4 are provided on the tank body 1. A diversion channel 5 matched with a bottom of the tank body 1 is provided inside the tank body 1, and both ends of the diversion channel 5 are respectively connected with the liquid inlet 3 and the liquid outlet 4. A vent hole 6 and a liquid refill hole 7 are sequentially provided on a side of the diversion channel 5 in a flow direction of a coolant liquid, and the vent hole 6 and the liquid refill hole 7 are both communicated with the chamber 2.

Figure 6:
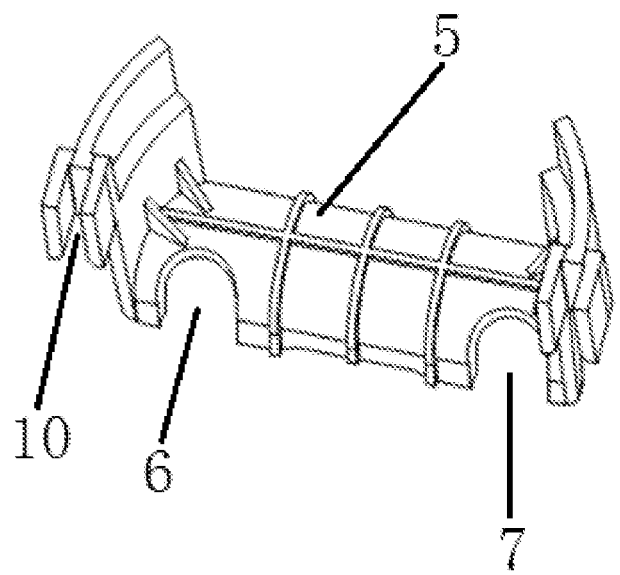
FIG. 6 is a schematic diagram illustrating a structure of a diversion channel according to Embodiment 2.
Figure 8:
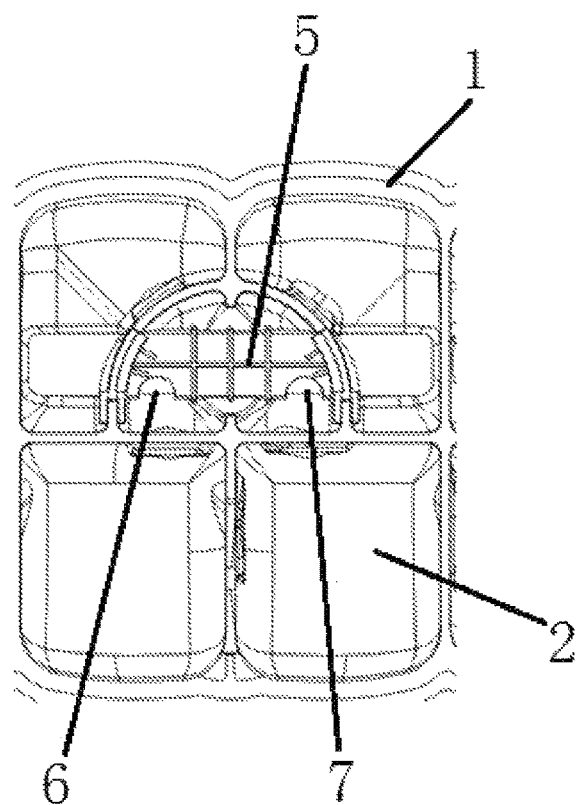
FIG. 8 is a schematic diagram illustrating a diversion channel assembled in a tank body according to Embodiment 2.
Figure 9:
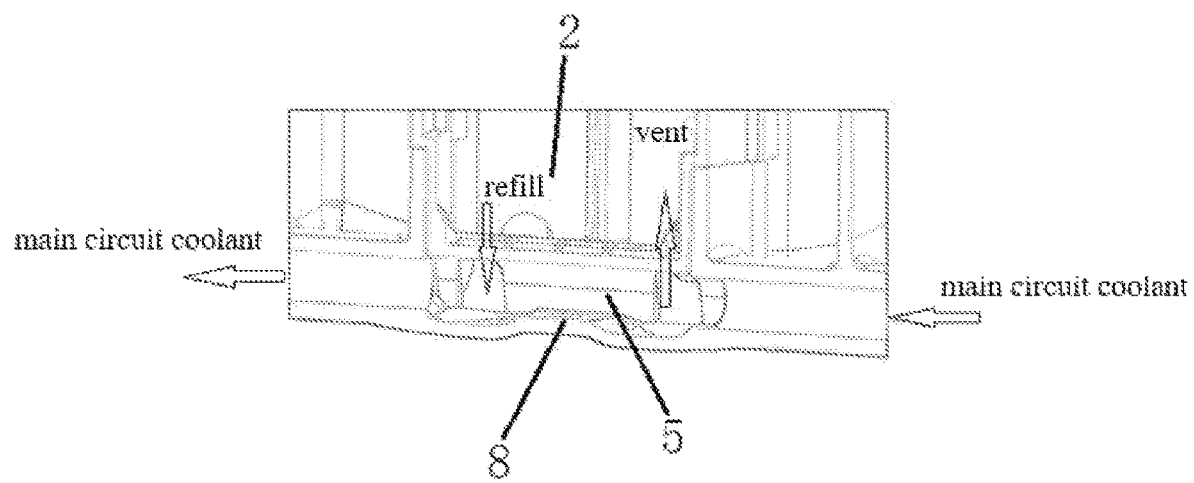
FIG. 9 is a schematic diagram illustrating principle of automatic degassing according to Embodiment 2.

As shown in FIG. 6, FIG. 8 and FIG. 9, the diversion channel 5 is a linear diversion channel, and the vent hole 6 and the liquid refill hole 7 are arranged on the same side of the diversion channel 5. A turbulence structure is provided on the bottom of the tank body 1. The turbulence structure includes a protrusion 8 which is provided on the bottom of the tank body 1 and protrudes upwards, where the protrusion 8 is matched with a bottom of the diversion channel 5, and is located between the vent hole 6 and the liquid refill hole 7. The liquid inlet 3 and the liquid outlet 4 are coaxially arranged. A plurality of partitions 9 are provided in the chamber 2 to divide the chamber 2 into a plurality of cavities which are communicated with each other, and the vent hole 6 and the liquid refill hole 7 are respectively connected with different cavities.

A clamping groove 10 is provided on the diversion channel 5, and a clamping plate matched with the clamping groove 10 is provided inside the tank body 1.

As shown in FIG. 10, the tank body 1 includes an upper tank body 101 and a lower tank body 102, and the liquid inlet 3, the liquid outlet 4 and the diversion channel 5 are all provided on the lower tank body 102.

In this structure, the turbulence structure matched with the bottom of the diversion channel 5 is provided on the bottom of the tank body 1, and the vent hole 6 and the liquid refill hole 7 are arranged on the same side of the diversion channel 5, such that the automatic liquid-gas separation is realized.

As can be seen from the above embodiments, the present invention can realize the automatic separation of the air from the coolant liquid and the automatic refill of the coolant liquid by providing the diversion channel 5 connecting the liquid inlet 3 and the liquid outlet 4 inside the tank body 1, and sequentially providing the vent hole 6 and the liquid refill hole 7 on the side of the diversion channel 5 in the flow direction of the coolant liquid. Since the expansion tank is directly connected in series to the main cooling circuit of the motor, the cost input and arrangement space of pipelines, pipe clamps, and liquid-gas separators are reduced, and the weight of the cooling system is also reduced. The diversion channel 5 can be designed in an arc bent outward or in a linear form so as to be suitable for different expansion tanks, allowing for good flexibility.

The foregoing description of the embodiments is provided to facilitate the understanding and use of the invention by those ordinary skilled in the art. It will be apparent to those skilled in the art that various modifications can readily be made to these embodiments and that the general principles described herein can be applied to other embodiments without any creative efforts. Therefore, the present invention is not limited to the above embodiments, and any improvements and modifications made by those skilled in the art according to the disclosure of the present invention without departing from the scope of the present invention should fall within the scope of protection of the present invention.

The invention claimed is:

1. An expansion tank for a vehicle cooling system, characterized in that,
    the expansion tank comprises a tank body and a chamber provided inside the tank body,
    a liquid inlet and a liquid outlet are provided on the tank body,
    a diversion channel matched with a bottom of the tank body is provided inside the tank body, and both ends of the diversion channel are respectively connected with the liquid inlet and the liquid outlet, and
    a vent hole and a liquid refill hole are sequentially provided on a side of the diversion channel in a flow direction of a coolant liquid, and the vent hole and the liquid refill hole are both communicated with the chamber,
    wherein a clamping groove is provided on the diversion channel, and a clamping plate matched with the clamping groove is provided inside the tank body.

2. The expansion tank for the vehicle cooling system according to claim 1, characterized in that, the diversion channel is in an arc bent outward, the vent hole is provided on an outer side of the diversion channel, and the liquid refill hole is provided on an inner side of the diversion channel.

3. The expansion tank for the vehicle cooling system according to claim 2, characterized in that, the vent hole is provided on a top of the outer side of the diversion channel, and the liquid refill hole is provided on a bottom of the inner side of the diversion channel.

4. The expansion tank for the vehicle cooling system according to claim 2, characterized in that, the liquid inlet is provided on a side of the tank body, and the liquid outlet is provided on the bottom of the tank body.

5. The expansion tank for the vehicle cooling system according to claim 1, characterized in that,
    the diversion channel is a linear diversion channel, and the vent hole and the liquid refill hole are arranged on a same side of the diversion channel, and
    a turbulence structure is provided on the bottom of the tank body.

6. The expansion tank for the vehicle cooling system according to claim 5, characterized in that, the turbulence structure comprises a protrusion which is provided on the bottom of the tank body and protrudes upwards, wherein the protrusion is matched with a bottom of the diversion channel, and is located between the vent hole and the liquid refill hole.

7. The expansion tank for the vehicle cooling system according to claim 5, characterized in that, the liquid inlet and the liquid outlet are coaxially arranged.

8. The expansion tank for the vehicle cooling system according to claim 5, characterized in that, a plurality of partitions are provided in the chamber to divide the chamber into a plurality of cavities which are communicated with each other, and the vent hole and the liquid refill hole are respectively connected with different cavities.

9. The expansion tank for the vehicle cooling system according to claim 1, characterized in that, the tank body comprises an upper tank body and a lower tank body, and the liquid inlet, the liquid outlet, and the diversion channel are all provided on the lower tank body.

10. A vehicle cooling system, characterized in that, the vehicle cooling system comprises the expansion tank according to claim 1.

* * * * *